P. N. LANDINE.
WIND SHIELD.
APPLICATION FILED MAR. 18, 1916.
1,251,055.
Patented Dec. 25, 1917.
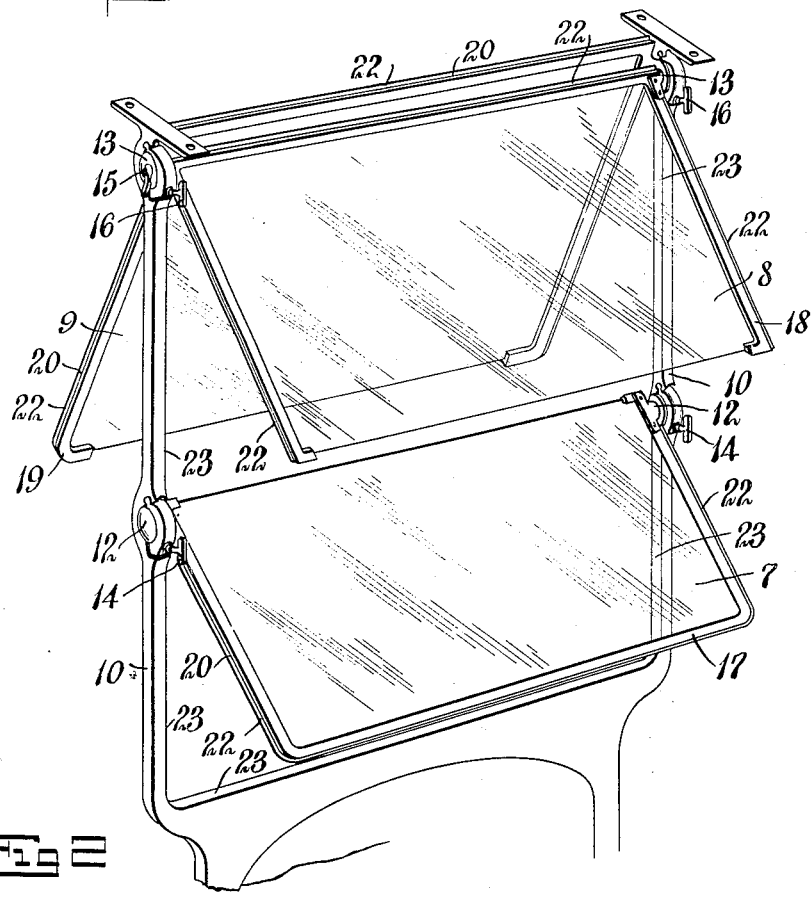
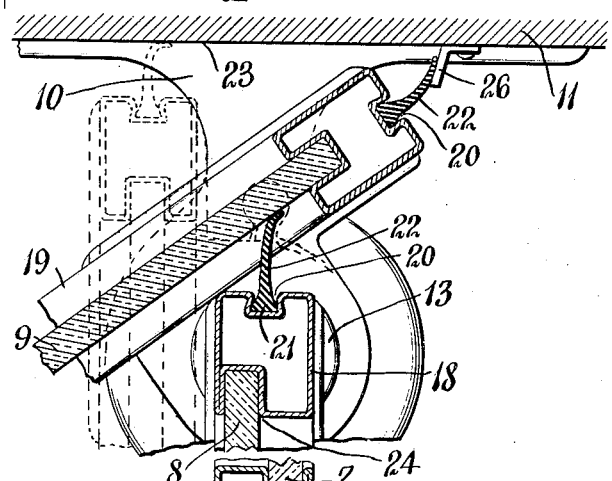
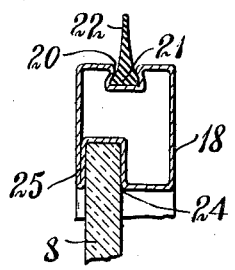
Inventor
Peter N. Landine
By his Attorneys

UNITED STATES PATENT OFFICE.

PETER N. LANDINE, OF MILFORD, CONNECTICUT, ASSIGNOR TO THE ROSTAND MANUFACTURING COMPANY, OF MILFORD, CONNECTICUT, A CORPORATION OF CONNECTICUT.

WIND-SHIELD.

1,251,055.  Specification of Letters Patent.  Patented Dec. 25, 1917.

Application filed March 18, 1916. Serial No. 85,039.

*To all whom it may concern:*

Be it known that I, PETER N. LANDINE, a citizen of the United States of America, residing at Milford, Connecticut, have invented a new and useful Wind-Shield, of which the following is a specification.

My present invention has for one of its objects to provide a simple, practical and inexpensive form of weather-excluding joint between the housing structure and the movable wind shield sections.

Another object is to do away with the use of separately applied attaching means such as are now commonly employed for securing the weather-excluding strip or element to the movable wind shield sections.

In the accomplishment of the foregoing and other objects, I construct the wind shield frame or frames with a groove in the outer edge thereof designed to receive and hold an outwardly extending weather-excluding strip arranged for engagement with the adjacent surface of the housing structure. The shield frames are preferably tubular in form and this enables the formation of the strip receiving groove by simply indenting the metal at the outer side of the tubular frame to the proper shape to hold the strip. Preferably, the strip holding groove is of undercut design and the weather-excluding strip is provided with a broadened base portion interlocking into said undercut groove.

Various other features and details of construction will appear as the specification proceeds, attention being directed to the accompanying drawing forming a part hereof and wherein I have illustrated a pratical and preferred form of the invention.

In this drawing:

Figure 1 is a perspective view of a wind shield structure having my invention incorporated therein.

Fig. 2 is an enlarged sectional view showing the wind shield sections in the closed weather-excluding position and the rain guard panel in extended relation.

Fig. 3 is a detail sectional view of the tubular wind shield frame and the weather-excluding strip applied thereto.

In the general view, Fig. 1, I have illustrated a wind shield made up of a lower shield section 7, an upper shield section 8, and a hinged rain guard panel 9, these several shield members being mounted on supporting posts 10, forming in connection with the roof or top 11, part of the housing structure.

The shield sections are pivotally mounted in the supporting frame so that they may be swung into different positions, the lower section being illustrated as pivotally supported on the centers 12 and the upper section and rain guard panel being concentrically pivoted on the pivotal center 13, suitable clamps 14, 15 and 16 being provided for securing the sections in different angular relations.

The frames 17, 18 and 19 of the three wind shield panels, as most clearly shown in Figs. 2 and 3, are of tubular form and of novel construction in that they have their outer sides or edge portions indented, as indicated at 20 to form undercut groove-ways to receive the thickened base portions 21 of the flexible weather-excluding strips 22.

These so-called weather-excluding T strips may be made of rubber or other suitable material, and they are sufficiently wide to extend outwardly fiom the swinging frames into engagement with the adjacent surfaces 23 of the housing structure.

The strip-retaining grooves are preferably formed in the tubular bars from which the frames are made, at the time of manufacture, and at the same time these tubular bars are preferably indented on the opposite inner sides, as indicated at 24 to form retaining grooves for the glass panels.

In Fig. 2 I have shown how, in the usual practice, the glass receiving groove in the upper frame is offset forwardly or nearer the front face of the shield and how the glass receiving groove in the lower frame is offset rearwardly, nearer the rear face of the shield. This arrangement brings the upper glass in a plane in front of the plane of the lower glass so that the two glasses may overlap at the center and this, as clearly shown in the illustration, is accomplished without offsetting the frames any, the upper frame being of the same thickness as and being disposed directly above the lower frame. In practice the offset glass receiving grooves are indented at the immediate edge of the tubular frame. This provides a double thickness of metal at the edge of the frame as indicated at 25 which reinforces the frame at that point, and this location of the offset glass receiving groove at the extreme edge of the frame enables also the use of a relatively thin frame.

In the first view all three panels are shown swung open into their ventilating positions, whereas in Fig. 2 the upper and lower wind shield sections are illustrated in their closed positions and the rain guard panel swung forwardly into its rain guarding position. In this last condition the weather strip on the top of the rain guard frame may engage with a stop strip 26 on the roof of the car, and the weather strip on top of the upper shield frame may engage direct with the face of the rain guard panel. This excludes the weather at these two points and so does away with the draft on the driver's head which has been a common fault with wind shields of this type.

What I claim is:

1. In combination with a windshield panel, a downwardly and forwardly inclined rain guard panel overlying the same and extending above the upper edge of said windshield panel, a housing in which said panels are mounted, an outstanding packing strip on the upper edge portion of the windshield panel engaging that portion of the inclined rain guard panel which extends above the same and an outstanding packing strip on the upper edge portion of the rain guard panel engaging the housing whereby close joints are provided between the panels and the housing.

2. In a windshield construction, shield supporting means comprising upper and lower tubular shield frames mounted in vertical alinement one above the other, the upper tubular shield frame having the inner wall thereof indented at the forward edge of the frame to form a glass receiving groove at said forward edge of the frame, the lower tubular shield frame having the inner wall thereof indented at the rear edge of the frame to form a glass receiving groove at said rear edge of the frame, a glass shield seated in said glass receiving groove at the rear edge of the lower frame, a glass shield seated in the glass receiving groove in the forward edge of the upper frame and overlapping the lower glass shield, the aforesaid tubular shield supporting means having the outer wall thereof indented inwardly into a packing strip groove and an outstanding packing strip seated in said packing strip receiving groove for engagement with a housing or the like.

PETER N. LANDINE.